United States Patent [19]

Woodall

[11] Patent Number: 4,913,451
[45] Date of Patent: Apr. 3, 1990

[54] VEHICULAR TOWING HITCH

[76] Inventor: Reginald O. Woodall, Corner of Mountain Pl. and High Mesa, P. O. Box 170, Alto, N. Mex. 88312

[21] Appl. No.: 272,915

[22] Filed: Nov. 18, 1988

[51] Int. Cl.$^4$ .............................................. B60D 1/14
[52] U.S. Cl. .............................. 280/478.1; 280/479.2; 280/491.5
[58] Field of Search .............. 280/478.1, 479.2, 479.3, 280/491.5, 491.1, 491.3; 403/353, 323

[56] References Cited

U.S. PATENT DOCUMENTS

| | | | |
|---|---|---|---|
| 2,830,829 | 4/1958 | Gensinger et al. | 280/491.1 |
| 3,287,027 | 11/1966 | Schuckman | 280/478.1 |
| 3,492,022 | 1/1970 | Hansen | 280/478.1 |
| 3,737,177 | 6/1973 | Gal | 280/495 |
| 3,912,119 | 10/1975 | Hill et al. | 403/353 |
| 3,938,830 | 2/1976 | Lane | 280/493 |
| 4,010,501 | 3/1977 | Cooke | 403/353 |
| 4,176,854 | 12/1979 | Hill et al. | 280/478.1 |
| 4,449,322 | 5/1984 | Blumenthal | 280/47.34 |

*Primary Examiner*—Mitchell Hill
*Attorney, Agent, or Firm*—J. Gibson Semmes

[57] ABSTRACT

A vehiclular towing hitch is described wherein its coupling to the frame or bumper of a towing vehicle may be easily connected and/or disconnected, simply by towing hitch extension and traverse. The towing hitch is characterized principally by an extendible tongue on its trailing end which is slidable, relative to draft bars and a tie bar, permitting, when extended, the angular dislocation thereof to the degree that an attached towing hitch may be readily secured to the towed trailer vehicle frame ball mount without any further movement at all of the towing vehicle relative to the towed vehicle.

1 Claim, 2 Drawing Sheets

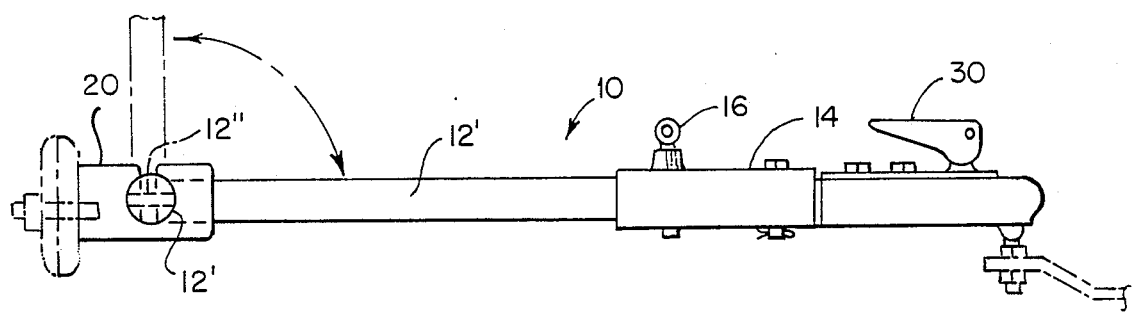
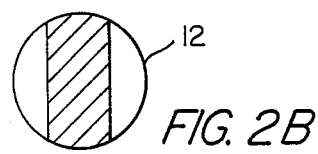
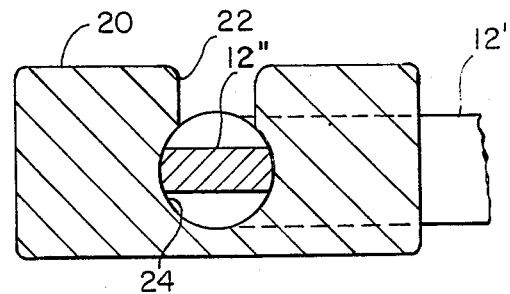
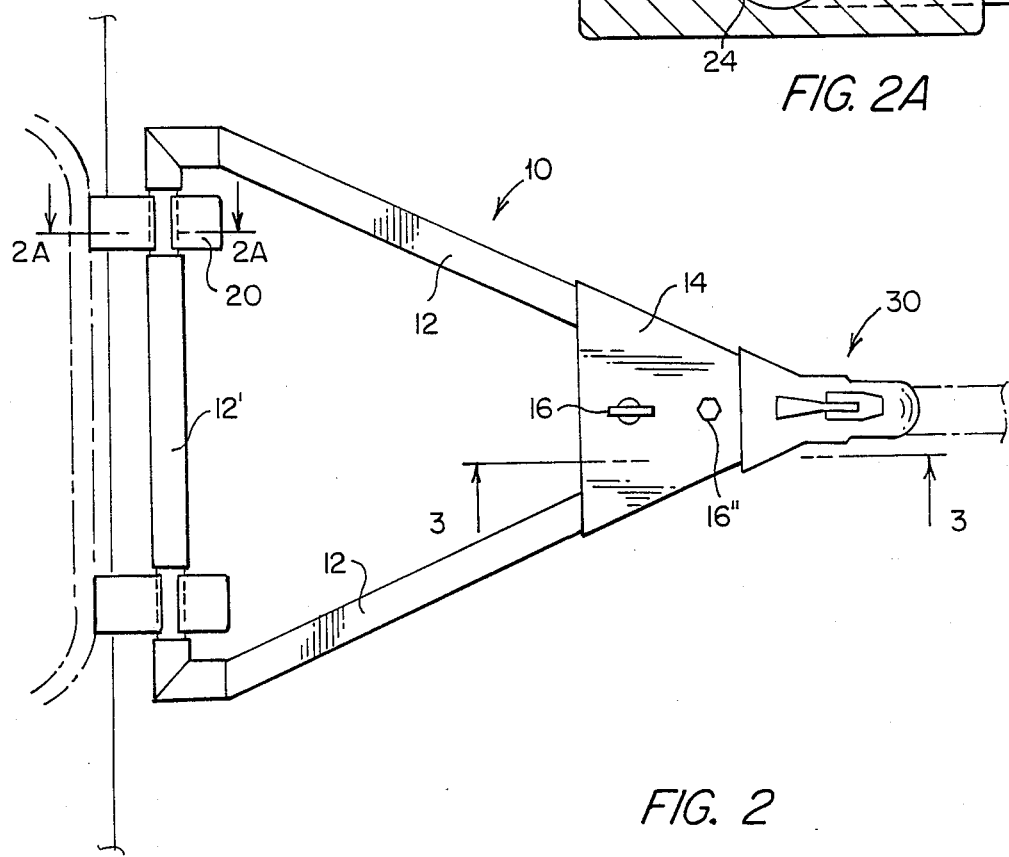

VEHICULAR TOWING HITCH

BACKGROUND OF THE INVENTION

This invention is a removable means for vehicular towing, the same being adapted from the towing vehicle to either the front or rear of a towed vehicle. Unique among the features of the invention include its removability from a vehicular chassis by disconnection and its maneuverability relative to the towed vehicle upon extension of a hitch portion thereof in its locked towing position. It is especially adapted as a tow-bar for towing smaller vehicles behind a recreation vehicle, wherein alignment during the hitching procedure has heretofore been rendered difficult and inconvenient, due to the misalignment of the towing and towed vehicles, relative to the hitch, per se and vice versa. The prior art, best known is as follows:

| U.S. Pat. No. | Inventor |
|---|---|
| 2,830,829 | S. J. Gensinger et al |
| 3,492,022 | R. S. Hansen |
| 3,737,177 | Martin Gal |
| 3,938,830 | O. B. Lane |

SUMMARY OF INVENTION:

This invention is a vehicular towing hitch assembly which is readily disassembled from coupling anchors, the latter of which may be secured to chassis or the bumper of the towing vehicle by a connect-disconnect arrangement, precedent to extension of the trailer hitch, per se, from draft and tow-bars. The hitch itself is swingable, left and right of the combination draft and tie-bars whereby, precedent to locking, a useful transverse excursion of the hitch may be made to seek and find the ball of the trailer hitch of the towed vehicle, irrespective of misalignment of the towing and towed vehicles. A tongue extension facilitates excursion of the trailer hitch receptacle relative to the draft and tie-bars as will be explained hereinafter.

BRIEF DESCRIPTION OF THE DRAWING:

FIG. 1 is a view in side elevation of invention showing its utility hitched position relative to the towing and towed vehicles.

FIG. 2 is a view in top plan of the invention in the utility position of FIG. 1.

FIG. 2A is partial vertical section view of coupling and tie-bar, illustrating the interlocking relationship of FIGS. 1 and 2.

Figure 3:
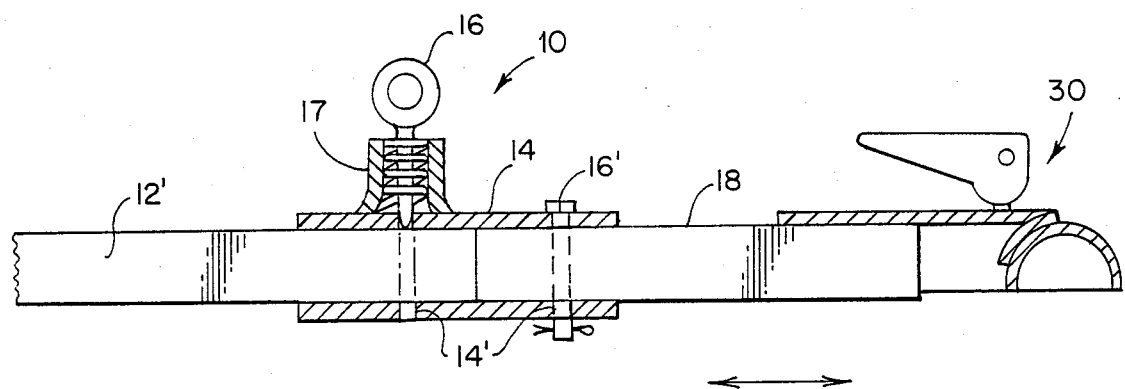
FIG. 3 is an expanded view of invention, shown in partial vertical section, taken along the lines 3—3 of FIG. 2, the extended pre-hitching position.

DESCRIPTION OF THE PREFERRED EMBODIMENTS:

Referring to FIGS. 1 and 2, the vehicular towing assembly 10 is formed of plural draft bars 12, interconnected at their rearward ends by the tie-bar 12'. The tie bar has the effect of forming a base for the triangular towing hitch configuration and is appropriately indented at least once as at 12", to form with at least one coupling member 20 a connect-disconnect draft mounting for the towing hitch per se. See FIG. 2A. As noted from FIGS. 1 and 2, the coupling anchors 20 are adapted to be secured by bolt or weldment to the towing vehicle bumper or other draft vehicular frame connection. The couplings 20 are preferably each provided with a well which extends transversely thereof, the well defining a vertical channel 22 which terminates at the bottom in a substantially tubular void 24. The vertical channel 22 will permit the tie-bar 12' to be inserted as the tie-bar and its indentation and attached draft bars comprising the major portion of the hitch are rotated into a vertical position, precedent to being lowered into the draft position. See vertical phantom of tie-bar FIG. 1. The horizontal wells are of pass-through configuration to adapt to the corresponding indentation of the tie-bar. When seated and then rotated downwardly, the tie-bar is secured for its draft function. This arrangement will be obvious from reference to FIGS. 2 and 2A wherein the indented or flattened portions of the tie bar 12' are shown in connection with the coupling 20. FIG. 2A, illustrates in section the towing position of the draft bar 12, its tie-bar 12' and connecting impressions 12" relative to the voids 22-24 of the coupling well 20.

Referring again to FIGS. 2 and 4, it will be noted that the draft bars 12 converge to be fixed by draft bar tow plate and stabilizer 14 which is adapted to overlie the converging ends of the draft bars and to permit slidable movement of the connecting tongue 18 for longitudinal and angular excursions, relative to the towing and towed vehicles, as will be explained more clearly by reference to FIGS. 3 and 4. Noteworthy is the, diverging angular relationship of the open ends of the draft bars 12, each bar terminating in a comparatively short, longitudinal bevel 13 and elongated bevel 13' each being disposed angularly relatively to the longitudinal axis, defined by the in-line snap lock ring and pin 16 and its counterpart pin 16'. Both pins are disposed vertically at right angles to tow plate housing 14. The snap lock ring and pin are substantially fully encased by a housing of the stabilizer having detent connection with the housing 14 to hold it in locked down position relative to plate and tongue, The housing 17 and associated compression spring forcibly guide the snap lock ring downwardly into locking engagement with the rear terminus of tongue cavity 18'.

Figure 4:
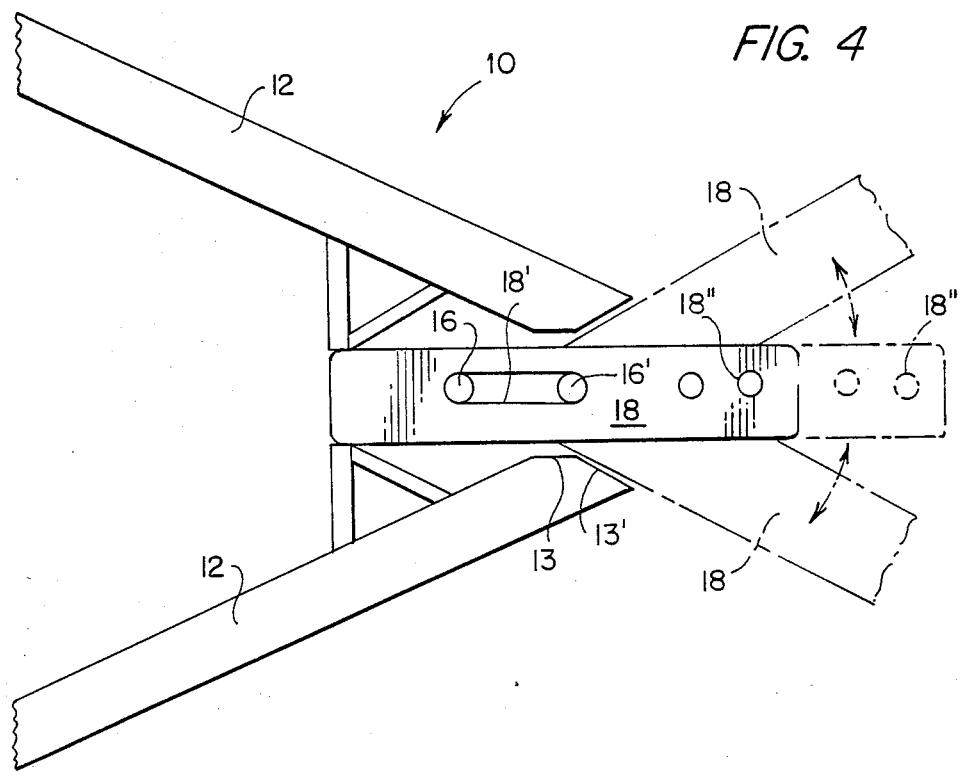
FIG. 4 is a partial view in top plan of the FIG. 3 extended position, the hitching plate exposing critical portions thereof, together with the interconnecting tongue.

As best shown in FIGS. 3 and 4, slidable tongue 18 is fitted on its free end to be engaged and disengaged by the spring-loaded snap lock 16 and to be moved, relative to its counterpart pin 6'. The tongue 18 is provided on its free end with an elongated aperture 18' the same being adapted to provide anchor connection with the snap lock ring 16 in the towing mode and to provide in its opposite, extended mode a hinge, whereby the trailer hitch 0, secured to its closed end may be fixed. Tongue 18 may therefore contain in addition to the extended aperture 18', one or more bolt wells 18" whereby the hitch 30 may be secured in fixed relation thereto By reference to FIG. 4, one observes that the tow-bar or tongue 18, as in FIG. 3, is fully extended so that, irrespective of the position of the towing vehicle and its coupling, the tie-bar and draft bar assembly one may seek and find the trailer ball mount connection by shifting it laterally. Depending upon the angular relationship of the end extensions of draft bars 12, the tow assembly and its associated hitch, when extended, may be arcuately movable as much as required to facilitate connectibility establishing the hitch to the towed vehicle without further movement of the towing vehicle and its attached tow-bar elements.

Whereas the invention is defined as including plural draft-bars and an interconnecting tie-bar, the scope of invention is such as to encompass a frame which would include one draft bar and an open-ended tie bar in U-shaped configuration. In addition, various related means of movably securing the tongue to the end of the at least one tie-bar may be employed without departing from the spirit of invention as defined in the following claims.

I claim:

1. A vehicular towing hitch assembly, removably attachable to a vehiclular chassis comprising:
   (A) a towing frame including at least one tie-bar and at least one interconnected draft-bar, said tie-bar and draft-bar together having detachable engagement with a coupling, said at least one draft-bar terminating in a tow plate stabilizer;
   (B) at least one coupling engaging the chassis, and having a pass-through coupling well extending transversely to said coupling, said well defining a lengthwise void, an upper portion of said well being of rectangular cross-section and a lower portion of said well being of circular vertical cross-section, said at least one tie-bar having opposed portions thereof diminished in vertical cross section to rotatably fit into respective upper and lower portions of said coupling well, whereby as the towing hitch is rotated to vertical, it may be slid into said upper portion of the well and upon rotation thereof to the horizontal said tie-bar will register with said lower portion of the well to secure said tie-bar into position for the travel mode of the towing hitch;
   (C) a removable hitch tongue, slidably engaged by the tow plate stabilizer to alternately interconnect thereto in a fixed travel mode and to extend therefrom for moveable arcuate excursion in the hitching mode;
   (D) a trailer hitch fixed to the free end of the tongue;
   (E) snap lock means fully encased upwardly by a housing means on the tow plate stabilizer, engagable with the tongue to secure it against movement in the towing mode, said locking means comprising aligned pins at least one of which is retractable, relative to the tonque.

* * * * *

UNITED STATES PATENT AND TRADEMARK OFFICE
CERTIFICATE OF CORRECTION

PATENT NO. : 4,913,451
DATED : April 3, 1990
INVENTOR(S) : Reginald O. Woodall

It is certified that error appears in the above-identified patent and that said Letters Patent is hereby corrected as shown below:

Col. 1, line 32, Cancel "towing" and insert -- towed --;

line 38, Cancel "towed" and insert -- towing --;

Col. 2, line 4, Cancel "towing" and insert -- towed --;

Signed and Sealed this

Seventh Day of May, 1991

*Attest:*

HARRY F. MANBECK, JR.

*Attesting Officer*　　　*Commissioner of Patents and Trademarks*